Jan. 19, 1954     B. C. LYCAN     2,666,476
AUTO SEAT HEADREST
Filed Aug. 15, 1949     2 Sheets-Sheet 1
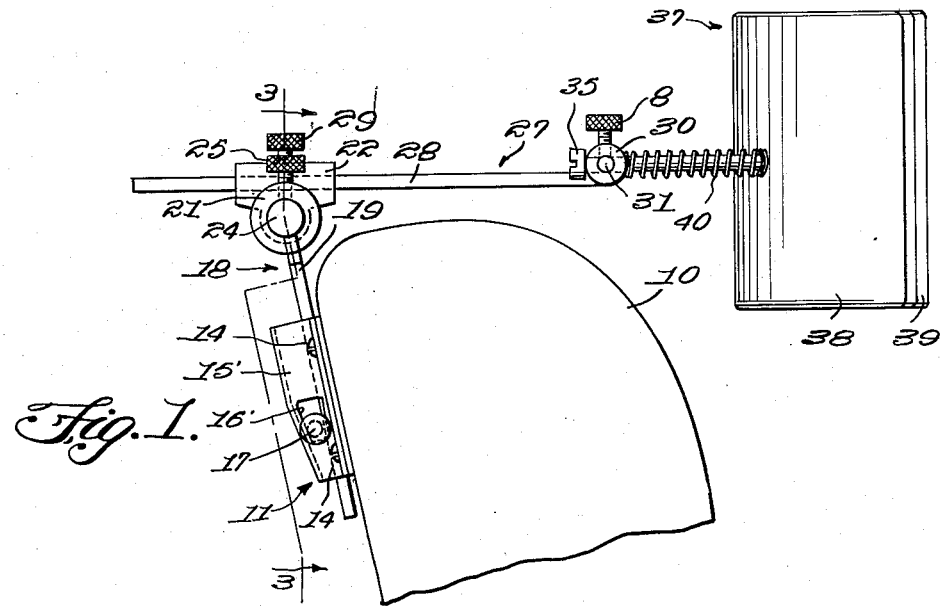
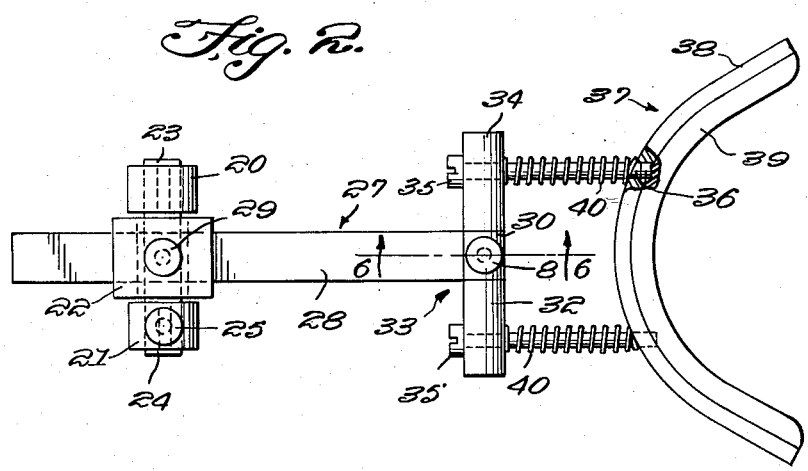
INVENTOR.
Bertha C. Lycan,
BY Victor J. Evans & Co.
ATTORNEYS Jan. 19, 1954        B. C. LYCAN        2,666,476
AUTO SEAT HEADREST Filed Aug. 15, 1949        2 Sheets-Sheet 2

INVENTOR.
Bertha C. Lycan,
BY Victor J. Evans & Co.
ATTORNEYS

Patented Jan. 19, 1954

2,666,476

UNITED STATES PATENT OFFICE 2,666,476

AUTO SEAT HEADREST

Bertha C. Lycan, Omaha, Nebr.

Application August 15, 1949, Serial No. 110,411

2 Claims. (Cl. 155—177)

1

This invention relates to a head rest or support, and more particularly to a head rest adapted to be attached to the seat of a vehicle, such as an automobile.

The object of the invention is to provide a head rest which is adapted to be readily attached to the front or rear seat of a vehicle for comfortably supporting the head of the occupant of the vehicle seat so as to enable the user to travel refreshed and in comfort.

Another object of the invention is to provide a vehicle head rest which can be adjusted to accommodate persons of various sizes, the head rest including a shock absorbing means for preventing injury to the user's head in the event that the vehicle suddenly stops.

A further object of the invention is to provide a head rest which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the head rest, showing the head rest attached to a vehicle seat, according to the present invention;

Figure 2 is a top plan view of the head rest, according to the present invention;

Figure 3:
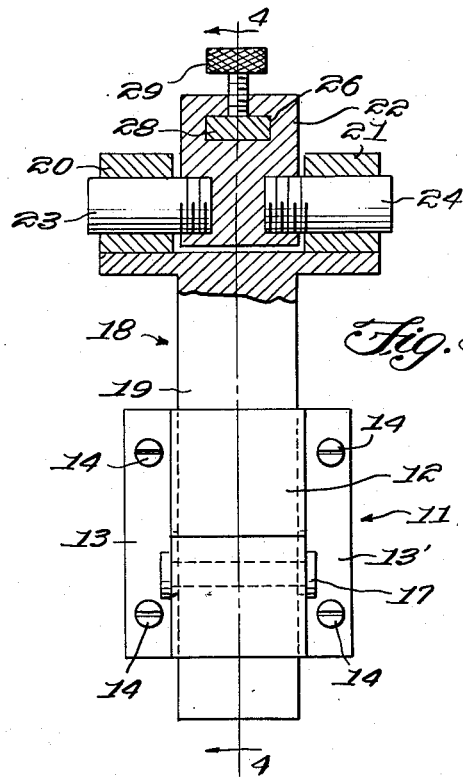
Figure 3 is an enlarged sectional view taken on the line 3—3 of Figure 1.
Figure 4:
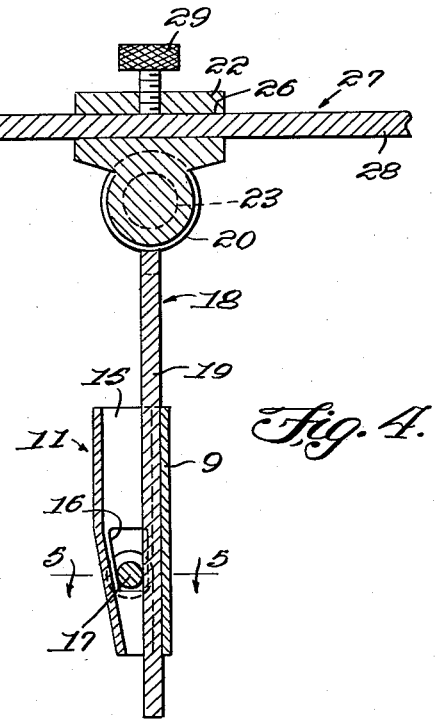
Figure 4 is a sectional view taken on the line 4—4 of Figure 3.
Figure 6:
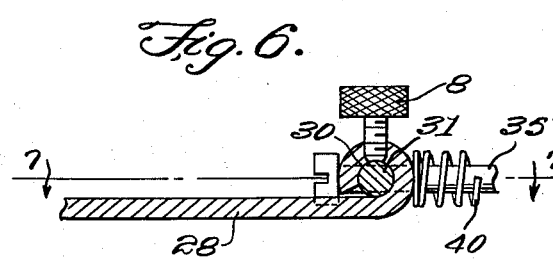
Figure 6 is a sectional view taken on the line 6—6 of Figure 2.

Referring in detail to the drawings, the numeral 10 designates a vehicle seat which may be either the front or rear seat of a vehicle, such as an automobile. The head rest of the present invention is adapted to be attached to the seat 10 so that an occupant of the vehicle can rest his or her head comfortably while another person is driving the vehicle so that the occupant can rest and become refreshed so as to later relieve the driver of the vehicle.

The head rest includes a bracket 11 which is shaped to define an end wall 12 and a pair of flanges 13 and 13' which abut the rear of the seat 10. Suitable securing elements, such as screws 14, project through the flanges 13 and 13' and into the rear portion of the seat 10 for securing the bracket 11 to the seat of the vehicle. The bracket 11 further includes a pair of spaced parallel side walls 15 and 15', there being a flared or tapering slot 16 in the side wall 15. The other side wall 15' of the bracket 11 has a similar flared slot 16'. A headed pin or shaft 17 extends between and beyond the slots 16 and 16' for a purpose to be later described.

The bracket 11 has its upper and lower end open and projecting through the bracket 11 is an adjustable standard 18. The standard 18 includes a shank 19 that is positioned between the pin 17 and plate or back seat 9. Thus, to adjust the standard 18 to any desired height, the pin 17 is raised in the slots 16 and 16' thereby permitting movement of the shank 19. After the shank 19 has been moved to its desired position, the pin 17 is moved to the lower ends of the slots 16 and 16' to thereby effectively lock the body member or standard 18 in its adjusted position.

Supported on the standard 18 is a pair of end pieces 20 and 21, the end pieces 20 and 21 being secured to the standard 18 in any suitable manner. Interposed between the end pieces 20 and 21 is a block 22 for a purpose to be later described. A threaded bolt 23 projects through the end piece 20 and into engagement with the block 22, while a similar threaded bolt 24 projects through the end piece 21 and into the other side of the block 22, bolts 23 and 24 serving to maintain the block 22 in place on the standard 18. A thumb screw 25 projects through the end piece 21 and into engagement with the bolt 24 for preventing accidental rotation of the latter.

The block 22 is provided with a channel way or slot 26 for slidably receiving therein the stem 28 of a horizontally disposed body member 27. Thus, the body member 27 can be adjusted in the block 22, and for maintaining the body member 27 immobile in its adjusted position, a thumb screw 29 is provided.

Figure 7:
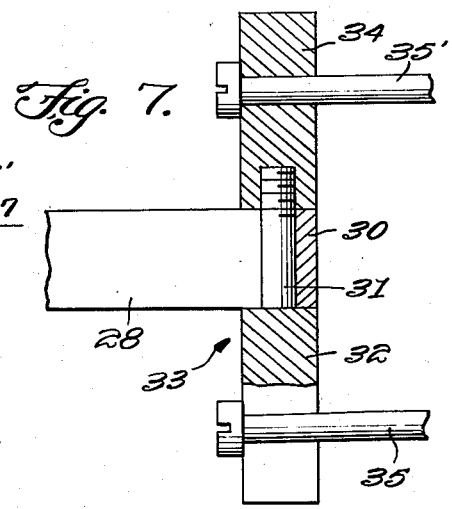
Figure 7 is a sectional view taken on the line 7—7 of Figure 6.
Figure 5:
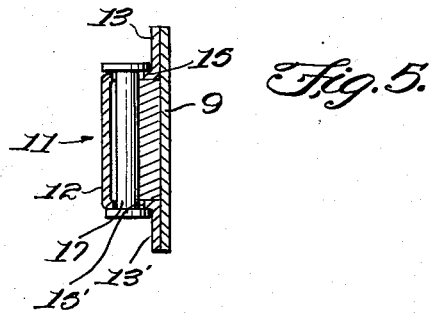
Figure 5 is a sectional view taken on the line 5—5 of Figure 4.

The front end of the stem 28 is curved to define an arcuate flange 30 which receives therein a threaded stud bolt 31. The stud bolt 31 has one of its ends secured to a leg 32 of a support member 33, while the other end of the stud bolt 31 is arranged in threaded engagement with the leg 34, Figure 7. A thumb screw 8 projects through the flange 30 and into engagement with the stud bolt 31 for preventing accidental rotation of the stud bolt 31.

Projecting forwardly from the legs of the support member 33 is a pair of spaced parallel horizontally disposed headed pins 35 and 35' which each have their front end threaded exteriorly for a portion of their length, as at 36, Figure 2. The headed pins 35 and 35' support a head engaging element 37. The head engaging element 37 includes an arcuate backing plate 38 which is arranged in threaded engagement with the ends 36 of the pins 35 and 35'. Secured to the front of the backing plate 38 is a cushion or pillow member 39, whereby the occupant's head is supported safely and comfortably. Circumposed on each of the pins 35 and 35' is a coil spring 40, and the coil springs 40 serve as shock absorbers to prevent injury to the user's head in the event that the vehicle suddenly stops.

From the foregoing, it is apparent that a head rest has been provided which will comfortably support a person's head while the person is travelling in a vehicle, such as an automobile. The head rest can be adjusted to accommodate various sizes of persons, and the head rest can be attached to either the front seat or the rear seat of the vehicle. To adjust the head rest vertically, the pin 17 is raised in the slot 16 and slot 16' whereupon the shank 19 of the standard 18 can be adjusted vertically in the bracket 11. When the shank 19 is at the desired position, the pin 17 is moved to its lowered position, as shown in Figure 1, to maintain the shank 19 immobile in its adjusted position. Further, the horizontally disposed body member 27 can be adjusted or moved in the block 22 as desired. Thus, to adjust the member 27, the thumb screw 29 is loosened, the member 27 is moved to the desired position, and the thumb screw 29 is then tightened. Further, the cushion member 39 and the coil springs 40 will eliminate injury to the neck or other parts of the anatomy caused by sudden stops or jerks of the vehicle.

Thus, by using the head rest of the present invention, the person can sleep and rest comfortably while another person drives so that relief can be later provided for the driver of the vehicle, thereby minimizing the possibility of accidents caused by tired drivers. The head rest can be easily removed from the seat 10 when not needed. Further, the head rest provides comfort for a sick person being transported in the vehicle. By using the head rest of the present invention, the occupants of the vehicle can rest or sleep so that the necessity of stopping overnight at a hotel will be obviated. The head engaging element is so constructed that the user's hat or hair will not be interfered with.

What I claim:

1. In a head rest, an open-ended bracket adapted to be attached to the back of a vehicle seat, said bracket including a pair of spaced parallel side walls, there being a flared slot in each of said side walls, a vertically disposed standard having a shank projecting through the open end of said bracket, a pin extending through the slots in said side walls for maintaining the shank immobile in its adjusted position in said bracket, a block supported on said standard having a channelway therein, a horizontally disposed body member having a stem slidably positioned in said channelway, a thumb screw extending through said block and into engagement with said stem for maintaining said standard immobile in its adjusted position, a support member operatively connected to the front end of said body member, a pair of spaced parallel horizontally disposed headed pins projecting forwardly from said support member, the front ends of said pins being threaded exteriorly for a portion of their length, a head-engaging element supported by said pins and including an arcuate backing plate arranged in threaded engagement with the threaded ends of said pins, a cushion secured to the front of said backing plate, and a coil spring circumposed on each of said pins to provide shock absorbers.

2. In an auto seat head rest, the combination which comprises a bracket having side walls with inclined slots therein and a vertically disposed opening extended therethrough, said bracket adapted to be attached to the back of a seat, a plate adapted to be positioned between the bracket and back of the seat, said inclined slots being positioned with the lower ends closer to the plate than the upper ends, a pin extended through said slots, a standard having a shank extended through the bracket and positioned between the pin and plate whereby downward movement of the shank results in a gripping action between the pin and plate, a block having a slot therethrough pivotally mounted on the upper end of the standard, a stem extended through the slot of said block, a head engaging element carried by an extended end of the stem, and means limiting the movement of the said head engaging element.

BERTHA C. LYCAN.

References Cited in the file of this patent

UNITED STATES PATENTS

| Number | Name | Date |
|---|---|---|
| 581,136 | Preece | Apr. 20, 1897 |
| 688,088 | Holtz | Dec. 3, 1901 |
| 1,471,168 | Katz | Oct. 16, 1923 |
| 1,639,194 | Lasater | Aug. 16, 1927 |
| 2,340,118 | Foulke | Jan. 25, 1944 |

FOREIGN PATENTS

| Number | Country | Date |
|---|---|---|
| 18,007 | Great Britain | Dec. 31, 1887 |